3,194,839
CATALYTIC HYDROGENATION OF NITRO-AROMATIC COMPOUNDS TO AROMATIC AMINES
Ralph M. Robinson and Rudolph G. Sundberg, Waukegan, Ill., assignors to Abbott Laboratories, North Chicago, Ill., a corporation of Illinois
No Drawing. Filed Apr. 12, 1962, Ser. No. 186,848
6 Claims. (Cl. 260—575)

The present invention relates to a new catalyst and the catalytic reduction of aromatic nitro compounds. More particularly, it is concerned with a very economical process of catalytically reducing nitro groups attached to an aromatic nucleus to the corresponding aromatic amino compounds in the liquid phase.

The prior art methods of reducing nitro groups are either impractical or uneconomical for one of the following reasons: high pressures and/or high temperatures are required, large quantities of catalyst are necessary, a low conversion rate of nitro group to amino group is attained, or very high dilution of the nitro compound in a solvent is required. Where a noble metal catalyst is employed, as for example in U.S. 2,619,503, very close observation of the reaction is required and it is necessary to control the reaction mixture at all times in such a manner that it never contains more than a certain low percentage of the nitro compound to be used as starting material, which means that the nitro compound can only be added at a rate corresponding to the hydrogen uptake. Other prior art methods such as, for example, the one described in British 832,153, require rigorous purification of the starting nitro compound to void it completely of phenolic impurities.

It is therefore an object of the present invention to provide a new and improved process for the hydrogenation of aromatic nitro groups to aromatic amino groups. It is another object of the present invention to catalytically hydrogenate aromatic nitro groups in the presence of a noble metal catalyst whereby the amount of unreacted nitro compounds present in the reaction mixture does not need to be controlled. A further object is the provision of a new noble metal catalyst. It is another object of the present invention to provide a new process for reducing aromatic nitro groups to aromatic amino groups by means of an extremely economical noble metal catalyst. A still further object of the present invention is the provision of a new catalytic hydrogenation process for aromatic nitro groups whereby the corresponding amino compounds are obtained in high yields in spite of using only low pressures and relatively low temperatures. Other objects will be apparent from the following disclosure and the appended claims.

These objects are accomplished by hydrogenating an aromatic compound of the formula

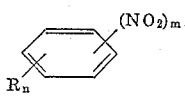

wherein R is a substituent stable to hydrogenation, e.g. alkyl, alkoxy, hydroxy and hydroxyalkyl and wherein m is an integer from 1 to 3 inclusive, and wherein n is an integer from 0 to 5 inclusive, with gaseous hydrogen, in the presence of a rhodium catalyst whose activity as a ring-hydrogenation catalyst is substantially exhausted.

The expression "substantially exhausted" defining the catalyst is meant to define a catalyst which has been used for hydrogenations wherein an aromatic compound was saturated to an alicyclic compound. The rhodium catalyst to which the present invention is directed is one that has lost essentially all its activity for ring hydrogenation promotion. This catalyst may have been used and reused with regenerations between uses, or it may be a catalyst that only lost a major portion of its activity for ring hydrogenations. In either case, such a catalyst is practically worthless for its originally designed use but, surprisingly, it has now been discovered that such a catalyst can be further utilized, particularly for the process to which the present invention is directed. Where the catalyst has been exhaustively used in ring-saturation hydrogenations, the above defined catalyst has the particular advantage of promoting reaction only to the extent of reducing the nitro group or groups, no matter what conditions are used within the limits discussed below and regardless of the time period during which the aromatic nitro compound is exposed to catalyst and hydrogen. If the catalyst is only substantially exhausted as ring-hydrogenation promoter, the aromatic bonds would only be affected after reduction of the nitro group or groups is completed, i.e. after 3 moles of hydrogen are absorbed per nitro group. Thus the reduction can be stopped easily before the much slower ring hydrogenation reaction sets in.

The rhodium catalyst referred to herein is one wherein the active site is metallic rhodium. In such a catalyst, the rhodium may be in the form of granules, sponge, pellets, chunks, and it may be supported by a carrier such as kieselguhr, alumina, carbon, zirconium oxide and bentonite. Since the rhodium catalyst previously fully served its purpose for a ring saturation hydrogenation, the discovery that this catalyst is still fully active for the reduction of nitro groups, is of extreme economical importance. No regeneration is necessary for the "substantially exhausted" catalyst before using it for the process of the present invention. Furthermore, the catalyst can be reused for a number of nitro group reductions in accordance with the present invention.

In a general embodiment, the process of the present invention is carried out by contacting an aromatic nitro compound with gaseous hydrogen in the presence of a rhodium catalyst the activity of which is exhausted as a ring hydrogenation catalyst. The theoretical amount of hydrogen is absorbed by the reaction mixture within a few hours without the use of excessive temepratures or pressures. For most economical operation this process is carried out at a pressure between atmospheric pressure and 150 p.s.i. and at a temperature between room temperature and 150° C. To those skilled in the art it will be apparent that higher temperatures and pressures may be used, but no necessity is seen for using high-pressure equipment where a process can be run at a satisfactory reaction rate in so-called low-pressure equipment which permits pressures up to 100 p.s.i., e.g. a Parr shaker, a glass-lined reactor, or similar equipment. Therefore, operating the process of the present invention at pressures below 100 p.s.i. is particularly advantageous.

To better describe the present invention, the following illustrative examples are given in detailed description. These examples are by no means to be taken as the only embodiments of the present invention and therefore are not meant to limit the invention in any respect.

*Example 1.—p-Phenylenediamine*

A mixture of 13.9 grams of p-nitroaniline, 35 ml. of water, 20 ml. of concentrated hydrochloric acid, 0.1 gram Nuchar C-190 (an activated carbon), 0.1 gram of Hy-Flo (a filter aid), and 0.5 gram of a catalyst containing 5% rhodium on alumina (0.18% catalyst ratio), is placed in a Parr shaker. The catalyst has previously been used and exhausted as a ring hydrogenation catalyst for the reduction of p-nitroaniline to p-cyclohexanediamine.

After rinsing the Parr shaker in the usual precautionary manner with nitrogen and subsequently with hydrogen, reduction is initiated by raising the hydrogen pressure to 58 p.s.i.g. and shaking. The temperature is allowed to rise to 100° C. during the course of the reaction, partly by the application of external heat, partly by the exothermicity of the reaction itself. After 3 hours and 25 minutes, 96% of the theoretical amount of hydrogen is absorbed. After 5 hours, 97.5% of the theoretical amount of hydrogen is absorbed and the hydrogenation is interrupted. The catalyst is filtered off and the filtrate is allowed to cool and neutralized with ammonium hydroxide. p-Phenylene-diamine of extremely high purity crystallizes from the mixture in a yield of 95% of theory.

Example 2.—Aniline

A mixture of 200 ml. of nitrobenzene, 2 ml. of Arquad 18–50 (a quaternary ammonium compound used as a dispersing agent), 3.6 grams of Hy-Flo, and 7.2 grams of catalyst containing 2.5% rhodium on alumina (0.08% catalyst ratio), is hydrogenated in a 500-ml. hydrogenation vessel at a maximum temperature of 60° C. and a maximum pressure of 65 p.s.i.g. hydrogen. After 10 hours and 40 minutes, the theoretical hydrogenation uptake is observed. The reaction mixture is filtered and the filtrate analyzed to show a concentration of 98.1% aniline on an anhydrous basis.

The catalyst used in this example has been previously exhausted as a ring reduction catalyst in the hydrogenation of aniline to cyclohexylamine.

Example 3.—Aminophenol

A mixture of 20.9 grams of p-nitrophenol, 40 ml. of water, 15 ml. of glacial acetic acid, and 0.25 gram of a catalyst containing 2.5% rhodium on alumina (catalyst ratio 0.03%) which was previously exhausted as a ring saturation catalyst, is placed in a Parr shaker and hydrogenated with gaseous hydrogen in the previously described manner, restricting the pressure to a maximum of 58.5 p.s.i.g. and the temperature to a maximum of 86° C. After 5 hours, 89.5% of the theoretical amount of hydrogen is absorbed, and after 5 hours and 52 minutes the theoretical amount of hydrogen is taken up. The reaction mixture is filtered and the filtrate is converted without purification to p-acetylaminophenol from this directly by adding a slight molecular excess of acetic anhydride. p-Acetylaminophenol crystallizes from this mixture in a yield of 60%, while the filtrate, after concentrating it under reduced pressure and neutralizing it with aqueous ammonia, yields additional p-acetylaminophenol.

By replacing p-nitrophenol above with o- or m-nitrophenol, the corresponding aminophenols or acetylaminophenols are obtained at otherwise unaltered procedural steps.

Example 4.—2,4-diaminotoluene

A mixture of 132 grams of 2,4-dinitrotoluene, 2.64 grams of a catalyst containing 2.5% rhodium on alumina (catalyst ratio 0.05%) which was previously exhausted as a ring saturation catalyst, and 1 ml. of Ethoquad O/12 (a polyethoxylated amine used as dispersant), is placed in a 500-ml. hydrogenation vessel and hydrogenated, after usual precautions, under a maximum hypdrogen pressure of 40 p.s.i.g. and a maximum temperature of 105° C. After 6 hours, 97% of the theoretical amount of hydrogen is taken up. The mixture is filtered hot, and the filtrate is cooled, whereupon 2,4-diaminotoluene crystallizes almost quantitatively. For purification, the crystalline product is dissolved in alcohol and the solution is fractionally distilled. The 2,4-diaminotoluene content of the crude fraction is 99% pure and 100% pure 2,4-diaminotoluene is obtained by recrystallization of the crude distillate from water.

The same process produces other diaminotoluenes by substituting 2,4-dinitrotoluene used above with other isomers of the dinitrotoluene series.

Example 5.—Reuse of catalyst

A mixture of 200 ml. of nitrobenzene, 2 ml. of Ethoquad O/12, and 9.6 grams of a catalyst containing 2.5% rhodium on alumina (0.10% catalyst ratio) which has previously been used in thirty-three consecutive ring hydrogenation reactions, is placed in a Parr shaker and hydrogenated at a maximum temperature of 60° C. and a maximum pressure of 60 p.s.i.g. Hydrogen uptake is complete in 4 hours and 15 minutes. The mixture is filtered and from the filtrate an almost theoretical amount of aniline is recovered.

The catalyst on the filter is sucked dry and placed in the Parr shaker again with another 200 ml. of nitrobenzene and 2 ml. of the above dispersant. Under the same hydrogenation conditions, hydrogen uptake is complete in less than 5 hours, again yielding almost the theoretical amount of aniline.

Example 6.—Aniline

This example demonstrates that the type of dispersant used is of no consequence to the process of the present invention where such a dispersant is used.

A mixture of 200 ml. of nitrobenzene, 9.6 grams of a 2.5% rhodium on alumina catalyst (catalyst ratio of 0.10%) which was previously exhausted as a ring saturation catalyst and which is mixed with 4.8 grams of Hy-Flo, and 2 ml. of a dispersant, are placed in a 500-ml. hydrogenation vessel and hydrogenated under a maximum pressure of 60 p.s.i.g. at a reaction temperature between 50° and 60° C. The following dispersant types are used:

Diamine salt, e.g. Duomeen TDO
Polyethoxylated amine, e.g. Ethomeen S/12
Methylsulfate quaternary ammonium salt, e.g. Propoquad HT/12
Quaternary ammonium chloride, e.g. Arquad 2C–75.

In all these examples the theoretical amount of hydrogen is absorbed in less than 4 hours, and from the reaction mixtures, after filtration of the catalyst, aniline is obtained by distillation in almost quantitative yields.

Other materials that can be used in the present process are 1,3,5-trinitrobenzene, 2,4,6-trinitrotoluene, nitroxylenes, m-nitrotoluene, o-nitrotoluene, and similar alkyl-substituted nitrobenzenes and nitrophenols. In other words, the present process produces aniline and C-substituted anilines from nitrobenzene and C-substituted nitrobenzenes when said substituents are inert, i.e. of such nature as not being attacked by catalytic hydrogenation, e.g. methyl, ethyl, isopropyl, butyl, hydroxy, methoxy, ethoxy, and similar substituents containing longer saturated carbon chains.

From the above examples it will be seen that the process of the present invention converts one or more nitro groups attached to an aromatic ring to the corresponding amino group or groups in the presence or absence of a dispersant, without affecting the double bond in the aromatic nucleus.

The use of a dispersant is indicated whenever the water generated by the reaction is not soluble in the reaction mixture. When the reaction is carried out in the presence of water and/or the starting material is soluble in water, the use of a dispersant is optional. Any type of dispersant is acceptable.

Among the advantages of using the new catalyst in the process of the present invention are the following: aromatic nitro groups are hydrogenated to aromatic amino groups without affecting the aromatic double bonds; the catalyst used in the process is practically without cost to the user since its activity has already been exhaustively used in other processes; the used catalyst can be metallic rhodium, rhodium supported on a carrier, and/or mixed with a filter-aid; a very small amount of catalyst will produce a satisfactory hydrogenation rate, i.e. a catalyst ratio of from 0.01% to 0.5% by weight of the new rhodium catalyst produces excellent results. Obviously, higher catalyst ratios can be used but an amount of above 2 grams of rhodium per 100 ml. of nitro compound produces no further beneficial effects. Another advantage of the new process is the fact that very mild process conditions will produce the desired hydrogenation, i.e. no high temperatures are necessary and the process is particularly adapted for use at low pressures, permitting the use of so-called low-pressure hydrogenation equipment. This is in contrast to other known processes for the production of aromatic amino compounds, which require high temperatures and/or high pressures and/or high catalyst ratios. The best practical upper limits for temperatures and pressures in the present process are 150° C. and 150 p.s.i., although in most instances, temperatures below 100° and hydrogen pressures between 1 and 100 p.s.i.g. are sufficient to produce rapid hydrogenation of the aromatic nitro groups to amino groups.

Others may practice the invention in any of the numerous ways which will be suggested to one skilled in the art by the present disclosure. All such practice of the invention is considered to be a part hereof provided it falls within the scope of the appended claims.

We claim:
1. The process of making an aromatic amino compound of the formula

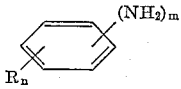

wherein R is a substituent selected from the group consisting of hydroxy, alkyl, amino, and alkoxy, $m$ is an integer from 1 to 3, $n$ is an integer from 0 to 5, and wherein the sum of $m+n$ is between 1 and 6 inclusive, comprising subjecting a nitro compound of the formula

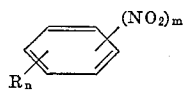

wherein R, $m$ and $n$ have the above meanings, to gaseous hydrogen at a temperature between room temperature and 150° C. and at a hydrogen pressure between atmospheric pressure and 150 p.s.i.,
in the presence of a minor amount of a rhodium catalyst whose activity as a phenylring-hydrogenation promoter is substantially exhausted.

2. The process of claim 1 wherein said rhodium catalyst is present in an amount of from 0.01% to 2.0% of the amount of said nitro compound.

3. The process of claim 1 wherein said hydrogenation is carried out at a hydrogen pressure below 100 p.s.i.g.

4. The process of claim 1 wherein said nitro compound is nitrophenol.

5. The process of claim 1 wherein said nitro compound is nitrobenzene.

6. The process of claim 1 wherein said nitro compound is dinitrotoluene.

References Cited by the Examiner
UNITED STATES PATENTS 2,765,342 10/56 Spiegler _____ 260—575
2,894,036 7/59 Graham _____ 260—580

OTHER REFERENCES

Yao et al.: Jour. Amer. Chem. Society, vol. 81, pages 4125–32 (1959).

CHARLES B. PARKER, *Primary Examiner.*